United States Patent
Ma et al.

(10) Patent No.: US 7,369,498 B1
(45) Date of Patent: May 6, 2008

(54) CONGESTION CONTROL METHOD FOR A PACKET-SWITCHED NETWORK

(75) Inventors: Jian Ma, Beijing (CN); Fei Peng, Beijing (CN); Jing Wu, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/168,009

(22) PCT Filed: Dec. 13, 1999

(86) PCT No.: PCT/EP99/09875

§ 371 (c)(1),
(2), (4) Date: Aug. 6, 2002

(87) PCT Pub. No.: WO01/45331

PCT Pub. Date: Jun. 21, 2001

(30) Foreign Application Priority Data

Jul. 20, 2001 (FR) .................................. 01 09709

(51) Int. Cl.
  *G01R 31/08* (2006.01)
  *H04L 12/66* (2006.01)
  *G06F 15/16* (2006.01)

(52) U.S. Cl. ...................... 370/235; 370/412; 370/236; 370/352; 709/232; 709/235

(58) Field of Classification Search ................ 370/229, 370/230, 231, 232, 233, 234, 235, 236, 352, 370/351; 709/232, 235
See application file for complete search history.

(56) References Cited

U.S. PATENT DOCUMENTS 5,313,454 A * 5/1994 Bustini et al. .............. 370/231

(Continued)

FOREIGN PATENT DOCUMENTS

EP  0 405 844 A2  6/1990
WO  WO 99/04536   1/1999

OTHER PUBLICATIONS

Newman P: "Backward Explicit Congestion Notification for ATM Local Area Networks" Proceedings of the Global Communications Conference (Globecom), U.S., New York, IEEE, vol. Nov. 29, 1993 (1993011-29), pp. 719-723, XP000427904.

(Continued)

*Primary Examiner*—Hanh Nguyen
(74) *Attorney, Agent, or Firm*—Squire, Sanders & Dempsey L.L.P.

(57) ABSTRACT

The present invention relates to a method and network for controlling congestion in a packet-switched network, comprising traffic sources, traffic destinations and network nodes, wherein a packet queue length in a network node is determined and a congestion notification is transmitted back towards the source address of an incoming data packet received at the network node, if the detected packet queue length exceeds a predetermined threshold. Then, congestion control is performed at a predetermined intermediate network node in response to the receipt of the congestion notification. Thereby, burts of source traffic can be constrained and unnecessary packet losses can be avoided already at an intermediate access node and within the network. The congestion notification message generated due to an incipient congestion is immediately routed back according to its source address. As a result, control delay time is shortened, such that buffer size requirements and number of congestion notification messages are reduced.

12 Claims, 4 Drawing Sheets

U.S. PATENT DOCUMENTS

| | | | | |
|---|---|---|---|---|
| 5,719,853 | A * | 2/1998 | Ikeda | 370/229 |
| 5,781,532 | A * | 7/1998 | Watt | 370/236 |
| 6,424,624 | B1 * | 7/2002 | Galand et al. | 370/231 |
| 6,438,138 | B1 * | 8/2002 | Kamiya | 370/468 |
| 6,584,111 | B1 * | 6/2003 | Aweya et al. | 370/412 |
| 6,625,118 | B1 * | 9/2003 | Hadi Salim et al. | 370/236 |
| 6,671,257 | B1 * | 12/2003 | Soumiya et al. | 370/230.1 |

OTHER PUBLICATIONS

Hunt R: "Frame Relay: Protocols, Architecture, Operation and Performance" Computer Communications, NL, Elsevier Science Publishers BV, Amsterdam, vol. 19, No. 9/10, Aug. 1, 1996 (1996-08-01), pp. 830-847, XP000626378.

* cited by examiner

CONGESTION CONTROL METHOD FOR A PACKET-SWITCHED NETWORK

FIELD OF THE INVENTION

The present invention relates to a method for controlling congestion in a packed-switched network, especially a wireless or mobile network in which the Transmission Control Protocol (TCP) is used as a transport layer protocol.

BACKGROUND OF THE INVENTION

Overload or congestion control is one of the key mechanisms to accommodate the increasingly diverse range of services and types of traffic in the Internet. As commonly known, TCP is the most popular transport layer protocol for data transfer. It provides connection-oriented reliable transfer of data between two connecting hosts, wherein a host refers to a network-connected computer or to any system which can be connected to a network for offering services to another host connected to the same network. TCP uses several techniques to maximize the performance of the connection by monitoring different variables relating to the connection. For example, TCP includes an internal algorithm for avoiding congestion.

Congestion control relates to the general problem of traffic management for packet-switched networks. Congestion means a situation in which the number of transmission requests at a specific time exceeds the transmission capacity at a certain network point (called a bottle-neck resource). Congestion usually results in overload conditions. As a result, the buffers may overflow, for instance, so that packets are retransmitted either by the network or by the subscriber. In general, congestion arises, when the incoming traffic to a specific link is more than the outgoing link capacity. The primary function of congestion control is to ensure good throughput and delay performance while maintaining a fair allocation of network resources to the users. For the TCP traffic, whose traffic patterns are often highly bursty, connection control poses a challenging problem. It is known that packet losses result in a significant degradation in TCP throughput. Thus, for the best possible throughput, a minimum number of packet losses should occur.

Currently, several schemes, including Fast-TCP, have been put forward to enhance the function of avoiding congestion in the TCP flow control. Although the purpose of these mechanisms is to avoid packet droppings in case of queue overflows, network congestion cannot be completely avoided even with very perfect congestion avoidance mechanisms. Thus, it is still necessary to combine these mechanisms with existing TCP flow control mechanisms for congestion control, that is, source window reduction shall sometimes be invoked by lost packets due to a buffer overflow, to thereby alleviate the congestion in time.

Initially, the Internet was intended to support best-effort service, and the TCP congestion control method that was actually implemented has been developed on the assumption that the network would be treated as a black box. This means that the end nodes do not exercise control by directly ascertaining the state of routers and transmission lines, but rather regulate the traffic by inferring the network load indirectly from packet loss and response time fluctuations. In wired networks, this may not induce serious problems, as packet losses mainly occur due to congestion. However, in the presence of high error rates and intermittent connective characteristic as in wireless links, this reliance on packet drops as an indicator of congestion causes a significant degradation in TCP performance, since the TCP reacts to packet losses as it would in the wired environment. Namely, it drops its retransmit window size before retransmitting packets, initiates congestion control or avoidance mechanisms and resets its retransmission timer. This results in an unnecessary reduction in the link bandwidth utilization of wireless and mobile networks, causing poor throughput and very high interactive delays.

Recently, several schemes have been proposed to alleviate the effects of non-congestion-related losses on TCP performance over networks that have wireless or similar high-loss links.

In the article "Implementation and Performance Evaluation of Indirect TCP" by Ajay V. Bakre et al, IEEE Transactions on computers, Vol. 46, No. 3, March 1997, the Indirect-TCP protocol is described as one of the first protocols to distinguish different losses by splitting a TCP connection between a fixed and a mobile host into two separate connections at the base station, such that a more optimized wireless link-specific protocol tuned for better performance can be used over a one-hop wireless link. However, there are some drawbacks of this approach, such as loss of semantics, application re-linking and software overhead.

Furthermore, an ELN (Explicit Loss Notification) protocol has been proposed, wherein an explicit loss notification option is added to TCP acknowledgments, when a packet is dropped on the wireless link. In this case, future cumulative acknowledgments corresponding to each lost packet must always be marked to identify that a non-congestion-related loss has occurred. Moreover, it might be difficult to identify packets lost due to errors on lossy links and to determine a connection of a corrupted packet, since the header could itself be corrupted.

Additionally, another research area is described in "A proposal to add Explicit Congestion Notification (ECN) to IP" by K.K. Ramakrishnan et al, Internet Draft-kksjf-ecn-02.txt, September 1998, wherein congestion control is decoupled from packet loss. By doing this, packet losses will not invoke congestion control, such that transmission errors do not lead to a reduced throughput. In particular, an Explicit Congestion Notification (ECN) is added to a TCP acknowledgment option by detecting incipient congestion in the network. Upon receiving this ECN message, the transmitter reduces its congestion window whenever a loss occurs.

However, many current networks with routers whose main function is to route packets have no provision for the detection of an incipient congestion before a queue overflow occurs. Nevertheless, even if such a provision were provided, the packet marking rate could not catch up with its passing rate during periods where the average queue size exceeds an upper threshold. Therefore, routers drop packets rather than setting the ECN in the packet header.

In spite of all these difficulties, ECN is likely to be adopted gradually. Thus, accommodating migration is an essential requirement for future TCP networks.

As an indication of congestion when the buffer had not yet overflown, an ECN bit is set in the packet header when it arrives at the input port. Then, it is routed towards its destination. At the destination, the ECN bit is set in the next outgoing ACK (acknowledgment) packet and is returned by the receiving terminal to the source. Although it can be implemented in any asymmetric network node with a function of avoiding congestion, packet losses due to congestion will not be completely prevented, since the network conditions are complex and it is always difficult to grasp the extend to which the network will be congested. Moreover, due to the incremental development of the ECN mechanism and in order to overcome exceptions in normal ECN environments, it is required to combine the ECN scheme with existing TCP mechanisms for congestion control.

In the presence of high error rates and intermittent connective characteristics of wireless links, this entirely (TCP congestion control mechanism) or partly (ECN mechanism) reliance on packet losses to initiate congestion control results in an unnecessary reduction in the link bandwidth utilization, since packet losses not mainly occur due to congestion. To prevent packet losses irrelevant to congestion from initiating congestion control, a Wireless-ECN (WECN) message was proposed to be added just upon the occurrence of a first packet loss due to buffer overflow in a network node. Due to asymmetric considerations, a CE bit of the IP header, which is set in the intermediate network nodes, needs to be extracted and a WECN flag needs to be added at the receiver side, such that the control loop is the same as in the ECN mechanism. Compared to ECN, WECN acts in a more simple and unit way, since the complexity and inconsistency of buffer management in the networks and the more conservative TCP congestion control over a short-scale period at the source side, which are required in the ECN mechanism, are avoided. As it is very easy for WECN to be suited to any congestion control mechanisms, TCP congestion control mechanisms can get completely independent of retransmissioned strategies whether they have complete or part relation to lost packets, and high performance in wireless and mobile networks will invariably be obtained with the addition of this mechanism.

However, in the above TCP congestion control mechanisms, whenever the congestion control is performed before or after congestion, two common features exist. Firstly, the congestion control algorithm is implemented at the source terminal, and, secondly, the message used to indicate congestion and to invoke source window reduction must be forwarded from the receiver side. This leads to the following problems.

As the source window decreases very sharply and quickly at the threshold point, the buffers following the change in the window size in the network are not fully utilized and also oscillate very frequently with the result of low throughput and degraded performance. When the upper bound of the queue length is higher than the buffer threshold, a CE bit suggesting a reduced rate limit is set in the network node and must first be sent to the receiver, and then returned back to the controllable source. Thus, the source has to wait a round-trip time before receiving a response to the ECN messages. This long feedback delay of ECN messages causes low buffer utilization and a requirement of large buffer sizes.

SUMMARY OF THE INVENTION

It is therefore an object of the present invention to provide a congestion control for a packet-switched network, by means of which buffer utilization can be improved.

This object is achieved by a method for controlling congestion in a packet-switched network, comprising traffic sources, traffic destinations and network nodes, said method comprising the steps of:

determining a packet queue length in a network node;

transmitting a congestion notification back towards the source address of an incoming data packet received at said network node, if the detected packet queue length exceeds a predetermined threshold; and performing congestion control at a predetermined intermediate network node in response to the receipt of said congestion notification.

Furthermore, the above object is achieved by a packet-switched telecommunication network comprising:

network nodes interconnected by transmission lines;

user terminals acting as traffic sources which transmit data packets and as traffic destinations which receive data packets;

congestion notification means for determining a packet queue length in a network node, and for generating a congestion notification and transmitting said congestion notification back towards the source address of an incoming data packet received at said network node, if the detected packet queue length exceeds a predetermined threshold; and congestion control means for performing congestion control at a predetermined intermediate network node in response to the receipt of said congestion notification.

Additionally, the above object is achieved by a network node for a packet-switched telecommunication network, comprising congestion notification means for determining a packet queue length in a buffer means, and for generating a congestion notification and transmitting said congestion notification back towards the source address of an incoming data packet received at said network node, if the detected packet queue length exceeds a predetermined threshold.

Further, the above object is achieved by a network node for a packet-switched telecommunication network, comprising:

detecting means for detecting a congestion notification in a data packet touted through said network node; and congestion control means for performing congestion control in response to the detection result of the detecting means by controlling the rate of acknowledgments routed through said network node.

Accordingly, a simple implementation is provided to inform the traffic source at a very early stage that the network is becoming overloaded or congested and to control the source so as to slow down its transmission rate. The congestion notification is generated in the network and immediately routed back towards the source address, such that the control delay time is largely shortened and the intermediate network node can act as quick as possible. Since the congestion notification is kept from reaching the receiver and from being generated at the receiver, the TCP behavior at the receiver side can be maintained. Moreover, a support for the new mechanism in the TCP protocol is not required, since the new mechanism can be implemented only at the network protocol layer, such that complex interface facilities between the network protocol and the transmission control protocol can be avoided.

If the delay time of the control is appropriate, a steady state will be reached with an unchanged window size, a maximum mean queue length and stable packet buffers and ACK buffers in the network. In addition to the corresponding reduction of buffer size requirements in the network, a short control time period allows traffic to be kept under control using only a limited number of congestion notification messages. The combination or cooperation of the mechanism according to the present invention with ECN and WECN may effectively decrease the amount of ECN packets, if it is activated before the ECN mechanism is initiated.

Thus, each network node with asymmetric forward and backward path will gain benefits to avoid buffer overflow without the cost of long control loops. Due to the shortened control loop, the buffer utilization is highly improved.

Preferably, the determined packet queue length is an average packet queue length. Thereby, short term fluctuations of the queue length can be prevented from initializing the congestion control mechanism.

The congestion notification may be set in a data packet generated at the network node. This may be achieved by setting a predetermined bit in the header of the data packet. Moreover, another predetermined bit of the header of the data packet may be used to indicate that the queue length has dropped below the predetermined threshold. In case, the congestion control is performed in an IP network, the predetermined bit and the other predetermined bit may be bit No. 3 and bit No. 4 in the IPv4 TOS octet, respectively.

Moreover, a filtering step may be provided for limiting the transmission rate of the congestion notification. Thereby, the number of congestion notification packets is reduced to achieve an effective control so as to avoid the transmission of ineffective congestion notifications and also guarantee a sufficient number of congestion notifications.

Preferably, the header of the incoming data packet may be replicated and inserted into the generated data packet, wherein the source and destination addresses of the header are exchanged. Thus, even with a different backward path, the generated data packet will be transmitted back to the source and passed through the access node, since the destination address is identical to the source address.

The length of the generated data packet may be equal to the size of the header thereof. Thereby, network bandwidth can be remarkably saved due to the limited congestion notification overhead.

Preferably, the congestion notification is only transmitted, when an incoming data packet has been received.

The congestion control may be initialized in the intermediate network node in response to each congestion notification received from the packet-switched network. In particular, the congestion control may be performed by controlling the rate of acknowledgments routed through the intermediate network node. Preferably, a delay time or an acceleration time of the acknowledgments is calculated at intermediate network node in response to each arrival of the congestion notification. Particularly, a new acknowledgment rate may be calculated at the intermediate network node based on a respective one of the following conditional equations:

$$P_{new}=P_{old}*R1(R1<1), \text{ if said congestion indication has been received, or}$$

$$P_{new}=P_{old}+R2*P_{max}(R2<1), \text{ if a congestion relieve indication has been received,}$$

wherein $P_{min}<P_{new}<P_{max}$ and wherein $P_{old}$ denotes the acknowledgment rate before the change, $P_{new}$ denotes the acknowledgment rate after the change, $P_{min}$ denotes a minimum acknowledgment rate not larger than a round-trip time, $P_{max}$ denotes a maximum acknowledgement rate equal to an access link speed, and R1 and R2 denote predefined parameters.

Preferably, the rate of acknowledgments may be reset in response to the receipt of an acknowledgment indicating a congestion notification of a higher priority, e.g. an ECN or WECN acknowledgment. Thus, the currently passing rate of backward acknowledgments is equal to that of the forward packets in case of a network saturation, wherein this equivalence is removed when a congestion notification of the higher priority is received. The congestion notification of the higher priority may be determined on the basis of a predetermined bit setting in the header thereof.

Additionally, a window size prediction may be performed in the intermediate network node, wherein the rate of acknowledgment may be controlled on the basis of the window size prediction. Thereby, a more accurate delay time of the acknowledgments can be achieved. In this case, the above equations may be amended so as to read:

$$P_{new}=P_{old}*R1/(1+1/w),$$

if said congestion indication has been received, or $$P_{new}=P_{old}+R2*(1+1/w)*P_{max},$$

if a congestion relieve indication has been received, wherein w denotes the predicted window size.

The congestion notification means may be provided in at least one of the network nodes. Furthermore, the intermediate network node may be an access node of the telecommunication network. Preferably, the packet-switched telecommunication network is an IP network in which the TCP may be implemented.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
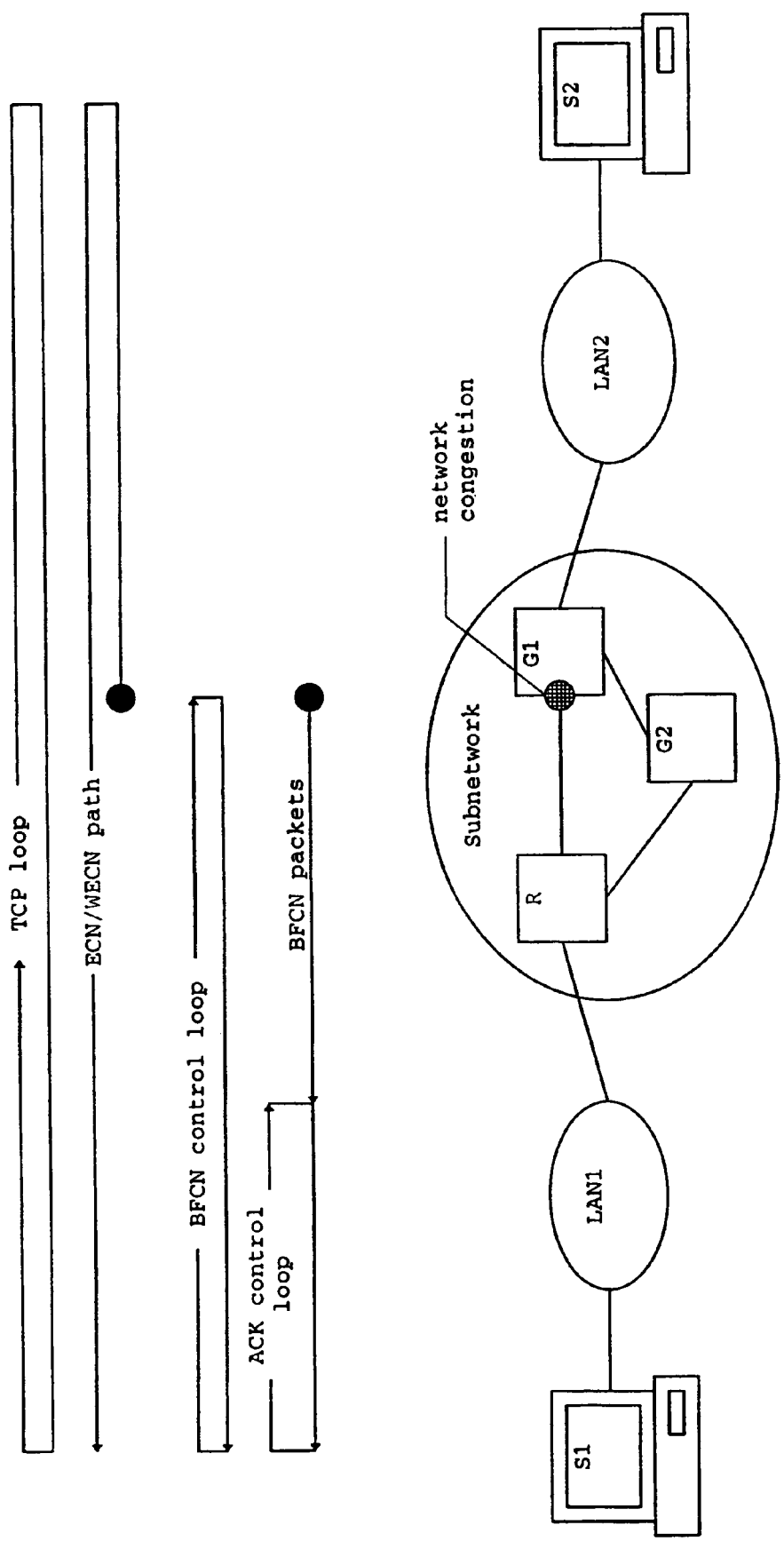
FIG. 1 shows a general block diagram of an IP network and flow control loops in the IP network, in which the preferred embodiment of the present invention is implemented.

In the following, the preferred embodiment of the congestion control method and packet-switched telecommunication network according to the present invention will be described on the basis of an IP network as shown in FIG. 1.

FIG. 1 shows a network configuration, wherein TCP sources S1 and S2 are connected via respective local area networks LAN1 and LAN2 to an IP subnetwork comprising network nodes such as an intermediate router R and gateways G1 and G2, through which data packets are transmitted in the IP subnetwork. Each of the local area networks LAN1 and LAN2 is connected to the subnetwork via a respective edge device, e.g. access node (not shown).

On the upper half of FIG. 1, the transmission path of the ECN/WECN messages and the TCP control loop are shown together with the respective control path and loop according to the preferred embodiment of the present invention. According to the known congestion control mechanisms, an individual congestion notification message such as ECN or WECN first travels to the receiver where it is returned back to the source to initiate a congestion control. Thus, the TCP control loop ranges from a respective source (e.g. S1) through the network system to a respective destination (e.g.

S2). If this known mechanism is used to invoke adaptive congestion control, a round-trip time of the whole TCP control loop is required before a reaction to a congestion is achieved.

According to the preferred embodiment, a congestion notification message is immediately routed back to its source IP address instead of being forwarded to the receiver, when it is generated due to an incipient congestion at a network node (e.g. the gateway G1). After the congestion notification message has been received at the access node between the LAN1 and the subnetwork, a congestion control is started at the access node and the congestion notification message is discarded. Thus, the control delay time is largely shortened and the access node may react in a quick manner. Since it is not required that the return path of the message is identical to the forward path of the respective data packets, the congestion control mechanism according to the preferred embodiment of the present invention can be used in any asymmetric network. Therefore, it is applicable in almost any network of today due to the widespread asymmetry of current networks. Moreover, since the congestion notification message does not reach the source and the receiver, a modification of the TCP behavior at the end-systems (e.g. the local area networks LAN1 and LAN2) is not necessary.

In the following, the congestion control mechanism according to the preferred embodiment of the present invention will be called Fast Backward Congestion Notification (FBCN). As can be gathered from FIG. 1, the BFCN control loop ranges from the network node at which the network congestion is detected to the source of the respective data packet. However, BFCN packets are only transmitted to the access node, where a congestion control based on an acknowledgment (ACK) control loop is initialized in response to the receipt of a BFCN packet. Thus, flow-control time in the IP network is reduced by the BFCN mechanism.

According to the preferred embodiment, the BFCN mechanism is divided into two parts, i.e. an adaptive congestion control mechanism and an individual congestion control notification strategy.

According to the individual congestion notification mechanism, each network node (e.g. router) is allowed to inform its congestion state by generating congestion notification messages (FBCN messages). The FBCN message generated at the respective network node is immediately routed towards the source terminal, to thereby achieve small feedback delays and hence provide a quick response to the congestion.

Figure 2:
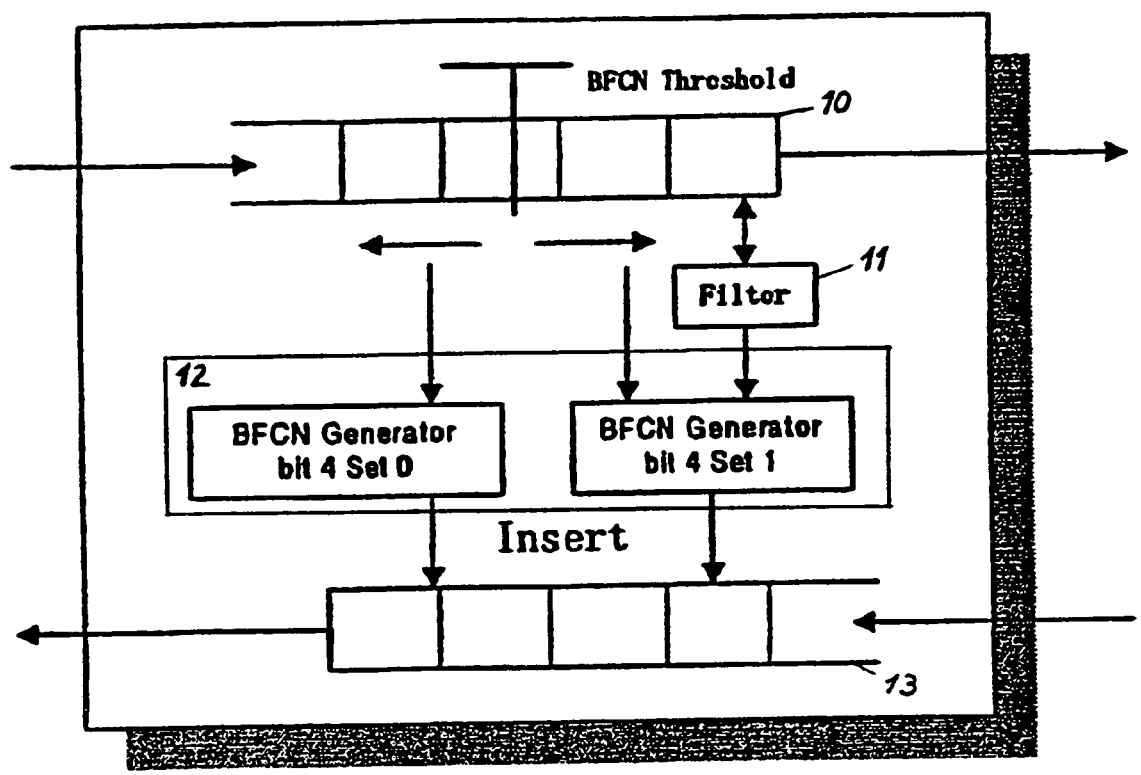
FIG. 2 shows a functional block diagram of an intermediate router according to the preferred embodiment of the present invention.

FIG. 2 shows a functional block diagram of the intermediate router R, which comprises a forward buffer 10, a backward buffer 13, a filter 11 and a congestion notification unit 12.

The congestion notification unit 12 comprises a mechanism for active queue management to detect incipient congestion in the forward buffer 10. For simplicity, only one FBCN threshold is set before the queue in the forward buffer 10 overflows. The congestion notification unit 12 determines an average queue length and compares this average queue length with the predetermined BFCN threshold. When the average queue length exceeds the BFCN threshold, an incipient network congestion is determined. When the average queue length drops below the BFCN threshold, a release of the congestion in this intermediate node is determined.

Whenever the buffer length in the network node exceeds or remains higher than the FBCN threshold, one FBCN packet is generated by the congestion notification unit 12 for each forward incoming packet or, alternatively, only for one FBCN packet upon the reach of the FBCN threshold, wherein an FBCN bit is set in the FBCN packet.

Although this is very simple to implement in hardware, many FBCN packets would constitute a waste of resources, since some of them are redundant and unnecessarily slow down the transmission rate by invoking congestion control at the access node. On the other hand, a too small number of FBCN packets would cause the function of the FBCN mechanism to be not fully utilized. Therefore, a filter 11 may be provided for reducing the number of FBCN packets in order to achieve an effective control by avoiding the transmission of ineffective FBCN packets. Moreover, the filter 11 guarantees that a sufficient number of FBCN packets is transmitted in order to avoid an inadequate FBCN mechanism. The optimum filter period is of the same order of magnitude as the maximum propagation delay for which the system is designed. The reason therefore is that it is useless to send further control feedback to the source before a previous feedback has had enough time to take effect. After the buffer size reaches a higher threshold, the filter 11 is activated and checks if one round-trip time leads to a reduction of the queue length below the higher threshold. If not, a new FBCN packet with a set FBCN bit is generated.

Furthermore, an FBCN packet with an FBCN bit turned off is generated if the queue length drops below the FBCN threshold. When the queue length remains below the threshold, no additional FBCN packet is generated and no filter mechanism is employed. Since the FBCN packet with a set FBCN bit is produced once per round-trip time, if buffer congestion still exists, the generation of the FBCN packet with a FBCN bit turned off will not exceed once per round-trip time. For example, if the congestion lasts longer than a round-trip time, the FBCN packet with FBCN bit "0" will not be generated until the length of the queue returns back to the lower threshold level. Thereafter, no additional FBCN packet with reset FBCN bit is generated, since the queue remains lower than the threshold, such that the total number of FBCN packets with reset FBCN bit is less than the number of packets with set FBCN bit. On the other hand, if the node congestion is released before a round-trip time has passed, the number of FBCN packets with FBCN bit of "0" (reset) is equal to those with FBCN of "1" (set) in this node.

Furthermore, the filter 11 may be arranged to generate an FBCN packet with CE bit turned off, when the forward buffer means 10 remains below the FBCN threshold.

In the access node, a method for delaying acknowledgments to implement adaptive congestion control is employed. Therefore, the constrained number of FBCN messages causes an infrequency of ACK rate control resulting in less variation of acknowledgments. Generally, without the generation of FBCN packets with FBCN bit set to "0", a recovery time is required to judge when the transmission will be increased and restored to the previous level at the access node, if no FBCN packets arrived during this time. Therefore, an optimal recovery time must be determined in the adaptive congestion control node through analysis and simulation. With the above two different kinds of FBCN messages, the access node in which the adaptive congestion control is implemented will increase the acknowledgment rate if a FBCN packet with reset FBCN bit has been received, since this indicates that the congestion in the notifying network node has been released.

In the ECN and WECN congestion control mechanism, the adaptive congestion control is implemented at the respective TCP source, while the FBCN congestion control is performed at the access node. Therefore, it is required to distinguish the congestion notification messages belonging to different mechanisms, when the backward packets pass through the access node. In view of the fact that no modification of the TCP implementation at the end system is required with the congestion control mechanism according to the preferred embodiment of the present invention, only a notification function achieved by a congestion notification field in the IP header is required, i.e. the FBCN mechanism requires no support from the transport protocol, and a negotiation between the end points of the transport layer during the setup phase to determine that all end points are FBCN-capable is not required.

Preferably, bit No. 3 and bit No. 4 of the IPv4 TOS octet may be used for the FBCN packet. Whenever an FBCN packet is generated in response to any change of the buffer queue length, bit No. 3 is required to be set. Furthermore, bit No. 4 is set when the buffer occupancy reaches the FBCN threshold or remains higher than the threshold, and is turned off or reset only once when the buffer occupancy drops below the FBCN threshold. Hence, an FBCN packet is identified only when bit No. 3 in the IPv4 TOS octet is set to "0" and the other bits of the bit Nos. 5, 6 and 7 are reset to "0".

In the ECN mechanism, bit No. 6 and bit No. 7 of the IPv4 TOS octet are designated as the ECT bit and the CE bit, respectively. In addition thereto, bit No. 5 in the IPv4 TOS octet can be chosen as the WECN-Echo flag used to indicate congestion packet losses by intermediate routers or other network elements. Thereby, a different window reduction can be initiated by the WECN congestion control.

When the average queue length in the forward buffer 10 exceeds the FBCN threshold, the FBCN packet is generated by latching the source and destination IP address of the incoming packets, setting or resetting the FBCN bit in the IP header, exchanging source and destination addresses in the generated FBCN packet in which the IP header is replicated from the forward passing packet. Then, the FBCN packet is inserted into the reverse direction stream of the backward buffer 13. Since the new destination address is equal to the source address of the forward packet, the FBCN packet can be returned towards the TCP source and passed through the respective access node of the IP network.

Preferably, the size or format of the generated FBCN packet is identical to that of the IP header of the forward packet, such that network bandwidth can be saved. In particular, FBCN packets may be generated only when there is a flow of data packets in the forward direction.

The FBCN mechanism guarantees that the congestion control is executed in a current round-trip time by quickly responding to previous FBCN messages in the same transmission window. Data transmission rate can be reduced and congestion can be alleviated before an amount of data corresponding to the transmission window has been received at the destination. This allows traffic to be kept under control using a limited number of FBCN messages. Moreover, since the FBCN mechanism requires only an IP indicator, an interface facility between IP and TCP can be avoided and there is no need for any changes in the response to the FBCN message at the receiver.

In the FBCN mechanism according to the preferred embodiment, the speed of the congestion notification is increased, since the FBCN message is sent only to the access node. Therefore, a corresponding adaptive congestion control mechanism is required to match up with the increased speed. In the preferred embodiment, the congestion control at the access node is initialized by each FBCN message returned back from the IP network. In particular, TCP acknowledgements (ACKS) traveling to a TCP source through the access node are controlled in response to the receipt of FBCN packets from the IP network or in response to a buffer exceeding notification generated in the access node.

Figure 3:
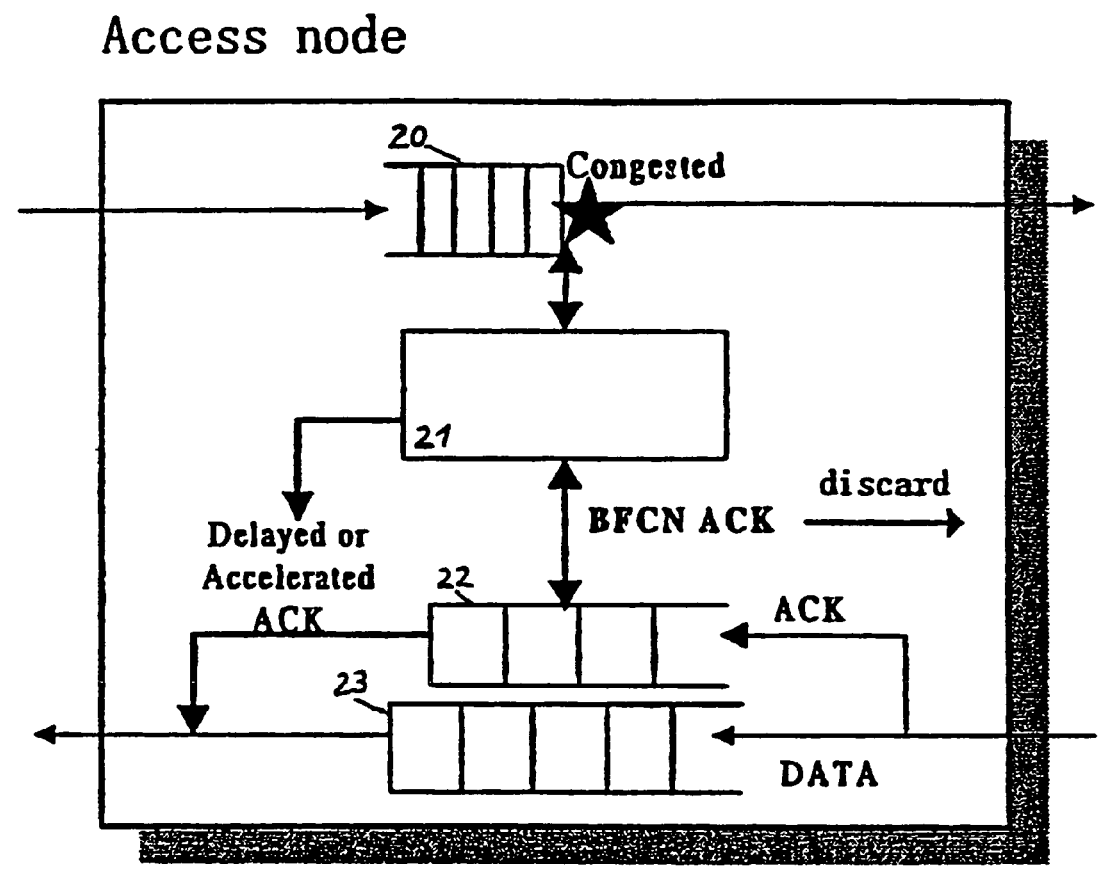
FIG. 3 shows a functional block diagram of an access node according to the preferred embodiment of the present invention.

FIG. 3 shows a basic functional block diagram of the access node of the IP network. According to FIG. 3, the access node comprises a forward buffer 20 for storing data packets to be transmitted in the forward direction, a backward acknowledgement buffer 22 for storing extracted acknowledgement packets received from the IP network, a backward data buffer 23 for storing data packets received from the IP network, and a congestion control unit 21 for performing congestion control based on a detection of an FBCN packet (i.e. FBCN ACK) received from the IP network or based on a detection of a congestion at the forward buffer 20.

According to the FBCN mechanism of the preferred embodiment, the congestion control unit 21 is arranged to detect whether an ACK packet is an FBCN packet or an ECN or WECN packet by checking the corresponding bit setting of the IP header, i.e. bits No. 3, 4, 5, 6 and 7 in the IPv4 TOS octet.

In the following, the congestion control performed in the congestion control unit 21 is described with reference to the flow diagram shown in FIG. 4.

Figure 4:
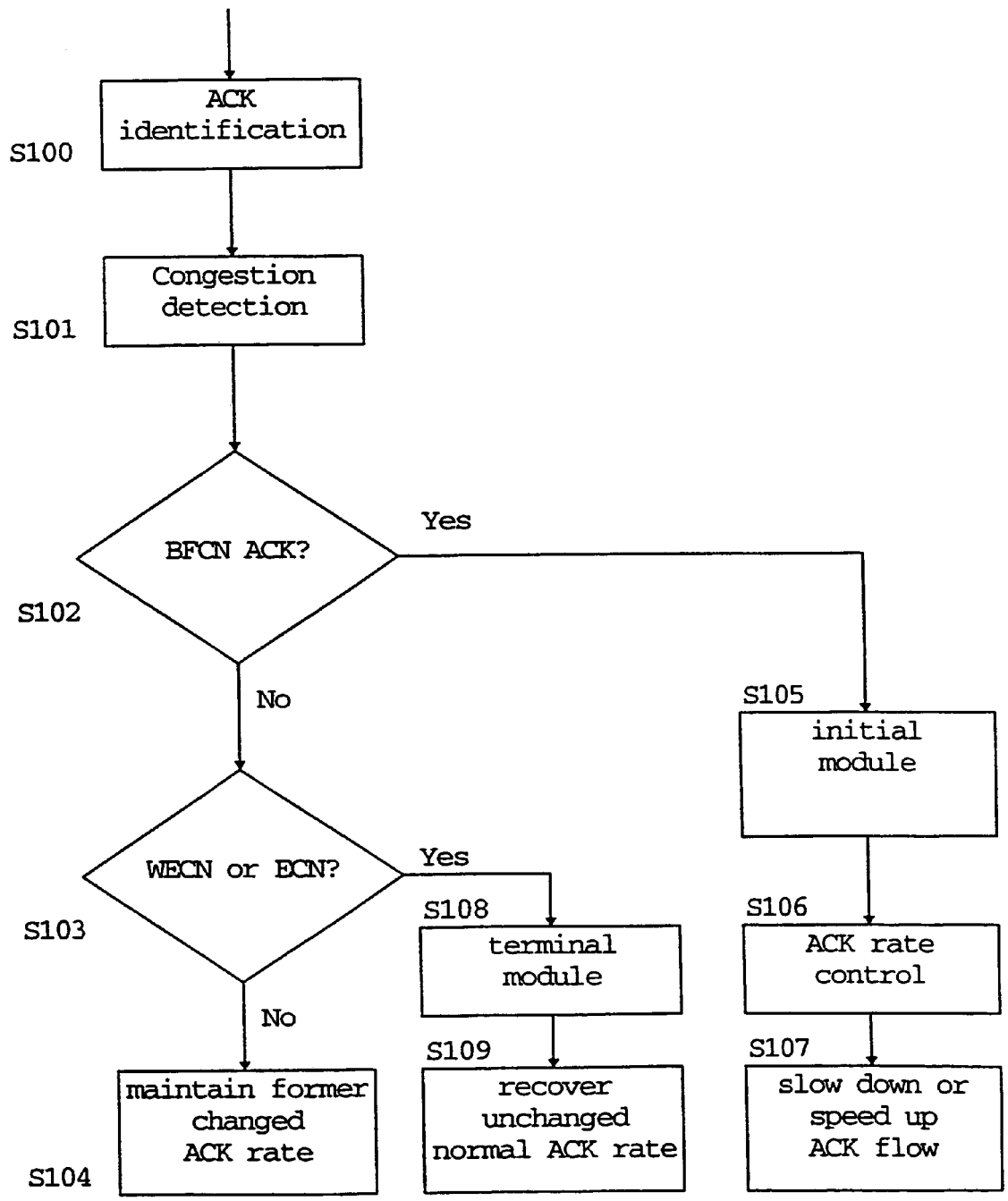
FIG. 4 shows a flow diagram of a congestion control method according to the preferred embodiment of the present invention.

According to FIG. 4, an ACK identification is performed in step S100 so as to extract ACK packets from the packet flow received from the IP network. This may be achieved by checking the IP header of the received packets. Then, the extracted ACK packets are supplied to the acknowledgement buffer 22 where they are stored.

Thereafter, a congestion detection is performed in step S101 where it is detected based on the bit setting of the IP header of the packet whether the ACK packet is an FBCN packet or an ECN or WECN packet. If it is determined in step S102 that bit No. 3 is not set in the ACK packet, i.e. the ACK packet is no FBCN ACK, the flow proceeds to step S103 where it is checked based on bit Nos. 5 to 7 whether the concerned ACK packet is a WECN or ECN packet. If not, the flow proceeds to step S104 where the current or former changed ACK rate is maintained.

If it is determined in step S102 that bit No. 3 is set, i.e. the concerned ACK packet is an FBCN packet, the flow proceeds to step S108 and an initial processing module is activated. In the initial module, a detector of the congestion control unit 21 detects FBCN packets in the backward path besides watching the queue length in the forward buffer 20 of the access node. Then, the ACK rate control in the access node is initiated and the FBCN packet is discarded in step S106. Thus, the FBCN packet does not reach the respective TCP source.

Based on an acknowledgement rate determined in step S106, a slow down or speed up of the ACK flow towards the TCP sources is then performed in step S107.

Otherwise, if it is determined in step S103, based on a setting of the bit Nos. 5 to 6 that the concerned ACK packet is a WECN or ECN packet, the flow proceeds to step S108 where a terminal processing module is initiated, so as to determine an end of the ACK rate control. Since a priority higher than that of the FBCN packet is given to the ECN or WECN packets, the terminal module ends up the FBCN control phase at the access node and returns the ACK rate to a normal or default rate (S109) whenever an ECN ACK or a WECN ACK is detected by the detector of the congestion control unit 21. Then, an invocation of adaptive congestion control at the respective TCP source follows after a round-trip time. Thereafter, a new control cycle starts and the detector of the congestion control unit 21 is used to determine whether the initial module is activated in step S105 or whether the terminal module is activated in step S108. After the access node is out of the FBCN state, the detector is employed to determine if the FBCN state has been reached without the ACK identification in step S100.

The ACK rate control of step S106 is performed as follows. When the congestion control unit 21 detects an FBCN packet with a bit setting (bit Nos. 3 and 4) of "2" (i.e. "10" in binary notation), a multiplicative decrease of the ACK rate is performed on the basis of a calculation according to the following equation:

$$P_{new} = P_{old} * R1 (R1 < 1)$$

When a congestion relieve FBCN packet with a value of the CE bits of "3" ("11" in binary notation) is received, an additive increase of the ACK rate is performed on the basis of a calculation according to the following equation:

$$P_{new} = P_{old} + R2 * P_{max} (R2 < 1) \quad (2)$$

In the above equations, $P_{min} < P_{new} < P_{max}$ holds, and $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters.

Once an ACK packet is accelerated or delayed based on the above equations, the subsequent ACK packets should maintain this speed until another buffer overflow or release notification is received from the IP network or the access node. When the current passing rate of the backward ACK packets is equal to the that of the forward packets, the network reaches saturation and maintains this speed until another congestion notification, e.g. an ECN or WECN information has been received which breaks this balance.

In order to achieve a more accurate delay time of ACK packets, an observer function may be provided in the congestion control unit 21, which provides a window size prediction to be able to know the effect of a released ACK packet on the source device. The observer function can be implemented according to the following subroutine which may be invoked at each release of an ACK packet:

WINDOW_OBSERVER
  if ($w < W_{mid}$)
    w=w+1
    return (1)
  elseif ($W_{mid} <= w < W_{max}$)
    wrec=wrec+1
    if (wrec==w)
      w=w+1
      wrec=0
      return (1)
    else
      w=w
      return (0)
  else
    w=w
    return (0)

Thus, below a predetermined threshold $W_{mid}$ (which is a parameter known to the access node or respective edge device, e.g. $W_{max}/2$), the window size is incremented at each release of an acknowledgement. Between the predetermined threshold $W_{mid}$ and the maximum window size ($W_{max}$), the rate of increase of the window size is reduced by defining a parameter wrec which is incremented every time an acknowledgement is released. The window size is not incremented before the parameter wrec has reached a value equal to the current window size w. When the window size w has been incremented, the parameter is reset to zero, and the procedure starts again. Thus, the number of acknowledgements between successive incrementations of the window size increases.

Apart from keeping track of the window size w, the above subroutine returns the increase in the window size caused by the release of the last acknowledgement. During initialization, w is set to zero, and $W_{max}$ is set to the maximum window size provided by the destination.

When a source device initiates a congestion window due to explicit congestion notifications, the detector function of the terminal module of the congestion control unit 21 perceives and initiates the end of the FBCN phase. Hence, the above mentioned observer function (e.g. subroutine) needs to be reset, which might be achieved e.g. by the following additional pseudo-code subroutine initiated in response to the detection of an explicit congestion notification:

---

RESET_OBSERVER( )

$W_{mid}$ = w/2
w = 1           (for a tahoe TCP mechanism)
w = $W_{mid}$      (for a Reno TCP or WECN mechanism)
w = $W_{mid}$ = w * 0.625   (for an ECN mechanism)

---

Thus, the reset value of the window size w depends on the kind of explicit congestion notification detected at the access node.

In case the above observer function is implemented, the above equations (1) and (2) for the ACK rate control in the congestion control unit 21 may be modified as follows:

Multiplicative rate decrease:

$P_{new} = P_{old} * R1/2$         (slow start phase)     (3a)
$P_{new} = P_{old} * R1/(1 + 1/w)$   (congestion avoidance phase)   (3b)

Additive rate increase:

$P_{new} = P_{old} + R2 * 2 * P_{max}$         (slow start phase)   (4a)
$P_{new} = P_{old} + R2 * (1 + 1/w) * P_{max}$  (cong. av. phase)   (4b)

As can be gathered from a comparison between the above equations (3a) and (4a) and the equations (1) and (2), the increase and decrease of the ACK rate is higher in a slow start phase where the window size has not yet any influence on the ACK rate. In a subsequent congestion avoidance phase, the increase and decrease values of the ACK rate are decreased towards those of equations (1) and (2) with increased predicted window size w.

Hence, in the adaptive congestion control according to the preferred embodiment, which is performed at the access node, the TCP source may automatically start to slow down its transmission rate, or at least it does not increase its transmission rate as fast as it otherwise would do, since the delay introduced at the access node slows down the rate at which the TCP source increases the size of its congestion window. Unlike FTCP, the FBCN mechanism is arranged to control the ACK output rate according to FBCN congestion notifications generated from each node of the network. Therefore, it can not only limit congestion at the access node, but simultaneously avoid unnecessary packet losses in the network due to the fact that bursts of the source traffic are constrained according to the whole network buffer occupancies, not just that of the access node. Moreover, if the delay time is appropriate, the mean queue length in the network is maximized, the window size will stop changing and the data packet buffer means 23 and the ACK buffer means 22 will stop growing at this point before window saturation. In this situation, the link utilization reaches very high values and the oscillation period increases due to the increased time spent in the steady state before the overload is increased. Since the queue empties less frequently, the whole throughput in the network of the network is improved.

The ACK delay time is optimized by implementing an ACK rate change policy with the above multiplicative decrease and additive increase scheme, when an FBCN packet is detected with a corresponding bit setting, to thereby enhance the function of keeping the steady state. Since the number of FBCN packets with bit setting is at least larger than that of FBCN packets without bit setting, the fast reduction of the transmission rate invoked by more FBCN packets averts congestion effectively, whereas the slow incrementation of the window size with less FBCN packets will ensure that the network reaches a steady state. After this steady state has been reached, the ACK rate remains stable.

Since the FBCN mechanism according to the present invention does not change the TCP behavior at the end-systems and WECN is essential to provide TCP end congestion control in wireless and mobile environments, the WECN scheme should be taken into account in the end-to-end congestion control. In addition, the congestion avoidance scheme could be enforced by combining the FBCN mechanism and the ECN-based control, wherein the FBCN buffer occupancy threshold is chosen lower than that of ECN so that the ECN-based control is activated after FBCN has take effect.

The processing order of the above shemes should be implemented in such a manner that the FBCN mechanism is initiated at first. Then, if the buffer size has reached the comparatively highest ECN threshold, the ECN mechanism starts. The WECN mechanism is initiated if a packet loss due to congestion occurs before ECN messages have been received from a data window. If ECN bit and WECN bit are both set in the IP header of a received packet, a higher priority may be allocated to WECN, since WECN indicates a heavier network congestion, and the source window reduction is initiated by WECN in this case. The cycle of these procedures is repeated in accordance with the buffer occupancies. Within such a cycle, the FBCN mechanism in the access node ends up when a WECN ACK or an ECN ACK has been detected, and the source congestion control will be invoked by any of them. However, different individual congestion notification messages may arrive at the source terminal during a round-trip time. To achieve a quick alleviation of congestion and avoid unnecessary waste of bandwidth, the TCP source may react only to the first congestion notification message, and the remaining ones are ignored if they arrive in the same congestion window.

In case FBCN packets arrive later than ECN or WECN packets, e.g. due to a drop of FBCN packets by corruption or backward passing routers, the FBCN mechanism should also be initiated even after the source window has been reduced by the previous ECN or WECN messages, since the FBCN mechanism aims at alleviating congestion within the current round-trip time and the FBCN messages arriving after the ECN or WECN messages indicate that the window reduction by WECN or ECN is not enough to avert congestion in this control cycle.

Thus, combining the FBCN mechanism with WECN and ECN invariably enhances the function of avoiding network congestion and largely improves the TCP performance in wireless and mobile environments.

The reasons for the termination of the FBCN function when an ECN or WECN packet arrives (terminal module) is that source-based congestion control mechanisms do not take the congestion control at intermediate network nodes into account and reduce the window size sharply upon receiving individual congestion notification messages. Therefore, the additional ACK delay control of the FBCN mechanism may be be redundant and may adversely affect performance when these source control mechanisms are activated.

Although the invention has been described here in connection with the preferred embodiment shown in the attached drawings, it is clear that the invention is not limited to IP networks, as it can be varied in several ways within the scope of the attached claims. The idea can in principal be applied to any other protocol which sends congestion notifications and performs congestion control based on these notifications. The equations used for calculating the rate of acknowledgements may also vary in many ways, as long as a delay reflecting the congestion situation is obtained. The user terminals may have a wireless access to the network.

In summary, the invention relates to a method and network for controlling congestion in a packet-switched network, comprising traffic sources, traffic destinations and network nodes, wherein a packet queue length in a network node is determined and a congestion notification is transmitted back towards the source address of an incoming data packet received at the network node, if the detected packet queue length exceeds a predetermined threshold.

Then, congestion control is performed at a predetermined intermediate network node in response to the receipt of the congestion notification. Thereby, burts of source traffic can be constrained and unnecessary packet losses can be avoided already at an intermediate access node and within the network. The congestion notification message generated due to an incipient congestion is immediately routed back according to its source address. As a result, control delay time is shortened, such that buffer size requirements and number of congestion notification messages are reduced.

The invention claimed is:
1. A method for controlling congestion in a packet-switched network, comprising traffic sources, traffic destinations and network nodes, said method comprising:
determining a packet queue length in a network node;
transmitting a congestion notification back towards the source address of an incoming data packet received at said network node, if the detected packet queue length exceeds a predetermined threshold; and
performing congestion control at a predetermined intermediate network node in response to receipt of said congestion notification;
wherein said congestion notification is indicated by setting a predetermined bit in a header of said incoming data packet, and another predetermined bit of the header of said incoming data packet is used to indicate that the queue length has dropped below said predetermined threshold, wherein said congestion control is performed by controlling the rate of acknowledgements routed through said intermediate network node, and wherein a new acknowledgement rate is calculated at said intermediate network node based on a respective one of the following conditional relationships:

$P_{new}=P_{old}*R1(R1<1)$, if said congestion indication has been received, or $P_{new}=P_{old}+R2*P_{max}(R2<1)$, if a congestion relieve indication has been received, wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters.

2. The method of claim 1, wherein said rate of acknowledgements is reset in response to the receipt of an acknowledgement indicating a congestion notification of a higher priority.

3. The method of claim 1, wherein said rate of acknowledgements is maintained, if it is equal to the rate of forward data packets.

4. The method of claim 1, wherein a window size prediction is performed in said intermediate network node, and wherein the rate of acknowledgement is controlled based on said window size prediction.

5. A method for controlling congestion in a packet-switched network, comprising traffic sources, traffic destinations and network nodes, said method comprising:

determining a packet queue length in a network node;

transmitting a congestion notification back towards the source address of an incoming data packet received at said network node, if the detected packet queue length exceeds a predetermined threshold; and performing congestion control at a predetermined intermediate network node in response to receipt of said congestion notification, wherein said congestion notification is indicated by setting a predetermined bit in a header of said incoming data packet, and another predetermined bit of the header of said incoming data packet is used to indicate that the queue length has dropped below said predetermined threshold, wherein said congestion control is performed by controlling the rate of acknowledgements routed through said intermediate network node, wherein a window size prediction is performed in said intermediate network node, and wherein the rate of acknowledgement is controlled based on said window size prediction, and wherein a new acknowledgement rate is calculated at said intermediate network node based on a respective one of the following conditional relationships:

$P_{new}=P_{old}*R1/(1+1/w)(R1<1)$, if said congestion indication has been received, or $P_{new}=P_{old}+R2*(1+1/w)*P_{max}(R2<1)$, if a congestion relieve indication has been received;

wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters and w denotes the predicted window size.

6. A packet-switched telecommunication network comprising:

network nodes interconnected by transmission lines;

user terminals acting as traffic sources which transmit data packets and as traffic destinations which receive data packets;

congestion notification unit configured to determine a packet queue length in a network node, and to generate a congestion notification and transmitting transmit said congestion notification back towards a source address of an incoming data packet received at said network node, if the detected packet queue length exceeds a predetermined threshold; and congestion control unit configured to perform congestion control at a predetermined intermediate network node in response to the receipt of said congestion notification;

wherein in said congestion notification unit is configured to set congestion notification in an incoming data packet generated at the network node, and is configured to set a predetermined bit in the header of said generated data packet in response to the queue length dropping below said predetermined threshold, wherein said congestion control unit is configured to perform congestion control by controlling the rate of acknowledgements routed through said intermediate network node, and wherein said congestion control unit is configured to calculate a new acknowledgement rate is at said intermediate network node based on a respective one of the following conditional relationships:

$P_{new}=P_{old}*R1(R1<1)$, if said congestion indication has been received, or $P_{new}=P_{old}+R2*P_{max}(R2<1)$, if a congestion relieve indication has been received;

wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters.

7. The telecommunication network of claim 6, wherein said congestion control unit is configured to maintain said rate of acknowledgements, if it is equal to the rate of forward data packets.

8. The telecommunication network of claim 6, wherein said congestion control unit is configured to perform a window size prediction and to control the rate of acknowledgement based on said window size prediction.

9. A packet-switched telecommunication network, comprising:

network nodes interconnected by transmission lines;

user terminals acting as traffic sources which transmit data packets and as traffic destinations which receive data packets;

congestion notification unit configured to determine a packet queue length in a network node, and to generate a congestion notification and to transmit said congestion notification back towards the source address of an incoming data packet received at said network node, if the detected packet queue length exceeds a predetermined threshold; and congestion control unit configured to perform congestion control at a predetermined intermediate network node in response to the receipt of said congestion notification, wherein said congestion control unit is configured to perform congestion control by controlling the rate of acknowledgements routed through said intermediate network node, perform a window size prediction and, control the rate of acknowledgement on based on said window size prediction and calculate a new acknowledgement rate based on a respective one of the following conditional relationships:

$P_{new}=P_{old}*R1/(1+1/w)(R1<1)$, if said congestion indication has been received, or $P_{new}=P_{old}+R2*(1+1/w)*P_{max}(R2<1)$, if a congestion relieve indication has been received;

wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, R1 and R2 denote predefined parameters, and w denotes the predicted window size.

10. A method for controlling congestion in a packet-switched network, comprising traffic sources, traffic destinations and network nodes, said method comprising:

determining a packet queue length in a network node;

transmitting a congestion notification back towards the source address of an incoming data packet received at said network node, if the detected packet queue length exceeds a predetermined threshold; and performing congestion control at a predetermined intermediate network node in response to receipt of said congestion notification;

wherein said congestion notification is indicated by setting a predetermined bit in a header of said incoming data packet, and another predetermined bit of the header of said incoming data packet is used to indicate that the queue length has dropped below said predetermined threshold, wherein said congestion control is performed by controlling the rate of acknowledgements routed through said intermediate network node, wherein a delay time or acceleration time of said acknowledgements is calculated at said intermediate network node in response to each arrival of said congestion notification, and wherein a new acknowledgement rate is calculated at said intermediate network node based on a respective one of the following conditional relationships:

$P_{new}=P_{old}*R1(R1<1)$, if said congestion indication has been received, or $P_{new}=P_{old}+R2*P_{max}(R2<1)$, if a congestion relieve indication has been received;

wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters.

11. A packet-switched telecommunication network comprising:

network nodes interconnected by transmission lines;

user terminals acting as traffic sources which transmit data packets and as traffic destinations which receive data packets;

congestion notification unit configured to determine a packet queue length in a network node, and to generate a congestion notification and transmit said congestion notification back towards a source address of an incoming data packet received at said network node, if the detected packet queue length exceeds a predetermined threshold; and congestion control unit configured to perform congestion control at a predetermined intermediate network node in response to the receipt of said congestion notification;

wherein said congestion notification unit is configured to set said congestion notification in the incoming data packet generated at said network node, and is configured to set a predetermined bit in the header of said generated data packet in response to the queue length dropping below said predetermined threshold, wherein said congestion control unit is configured to perform congestion control by controlling the rate of acknowledgements routed through said intermediate network node, wherein said congestion control unit is configured to calculate a delay time or acceleration time of said acknowledgements at said intermediate network node in response to each arrival of said congestion notification, and wherein said congestion control unit is configured to calculate a new acknowledgement rate is at said intermediate network node based on a respective one of the following conditional relationships:

$P_{new}=P_{old}*R1(R1<1)$, if said congestion indication has been received, or $P_{new}=P_{old}+R2*P_{max}(R2<1)$, if a congestion relieve indication has been received;

wherein $P_{min}<P_{new}<P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, and R1 and R2 denote predefined parameters.

12. A method for controlling congestion in a packet-switched network, comprising traffic sources, traffic destinations and network nodes, said method comprising:

determining a packet queue length in a network node;

transmitting a congestion notification back towards a source address of an incoming data packet received at said network node, if the detected packet queue length exceeds a predetermined threshold; and controlling a rate of acknowledgements routed through a predetermined intermediate network node to perform congestion control at the predetermined intermediate network node in response to the receipt of said congestion notification, a window size prediction being performed in said predetermined intermediate network node, and the rate of acknowledgement is controlled based on said window size prediction;

wherein a new acknowledgement rate is calculated at said intermediate network node based on a respective one of the following conditional relationships:

$P_{new} = P_{old} * R1/(1+1/w) (R1<1)$, if said congestion indication has been received, or $P_{new} = P_{old} + R2*(1+1/w)*P_{max} (R2<1)$, if a congestion relieve indication has been received;

wherein $P_{min} < P_{new} < P_{max}$, and wherein $P_{old}$ denotes the acknowledgement rate before the change, $P_{new}$ denotes the acknowledgement rate after the change, $P_{min}$ denotes a minimum acknowledgement rate not larger than a round-trip time, $P_{max}$ denotes a maximum rate equal to an access link speed, R1 and R2 denote predefined parameters and w denotes the predicted window size.

* * * * *

UNITED STATES PATENT AND TRADEMARK OFFICE
CERTIFICATE OF CORRECTION

PATENT NO. : 7,369,498 B1 Page 1 of 1
APPLICATION NO. : 10/168009
DATED : May 6, 2008
INVENTOR(S) : Jian Ma, Fei Peng and Jing Wu It is certified that error appears in the above-identified patent and that said Letters Patent is hereby corrected as shown below:

Title Page, Delete:

"(30) Foreign Application Priority Data

Jul. 20, 2001    (FR) ............................01 09709"

Signed and Sealed this

Twenty-sixth Day of August, 2008

JON W. DUDAS
*Director of the United States Patent and Trademark Office*